Jan. 14, 1941.  P. LANDROCK  2,228,880
PHOTOGRAPHIC APPARATUS
Filed July 6, 1938  10 Sheets-Sheet 2
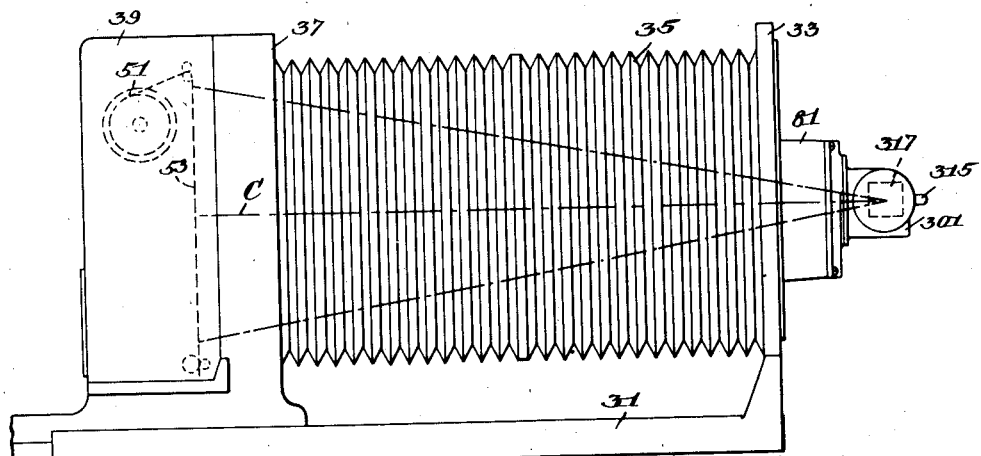
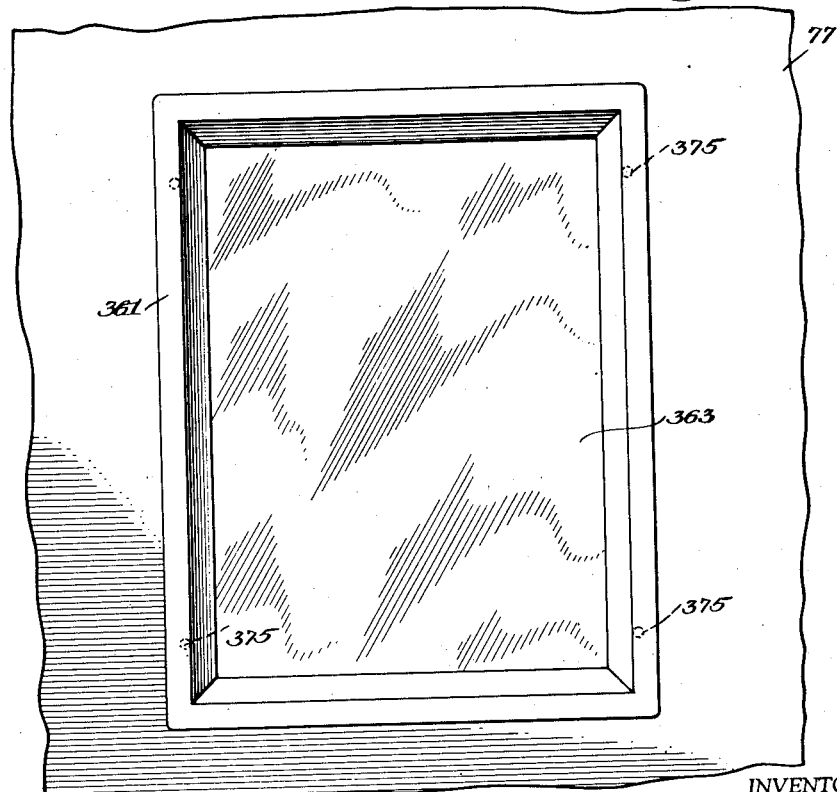
INVENTOR.
Paul Landrock
BY Cumpston & Shepard
his ATTORNEYS Jan. 14, 1941.　　　P. LANDROCK　　　2,228,880
PHOTOGRAPHIC APPARATUS
Filed July 6, 1938　　　10 Sheets-Sheet 3
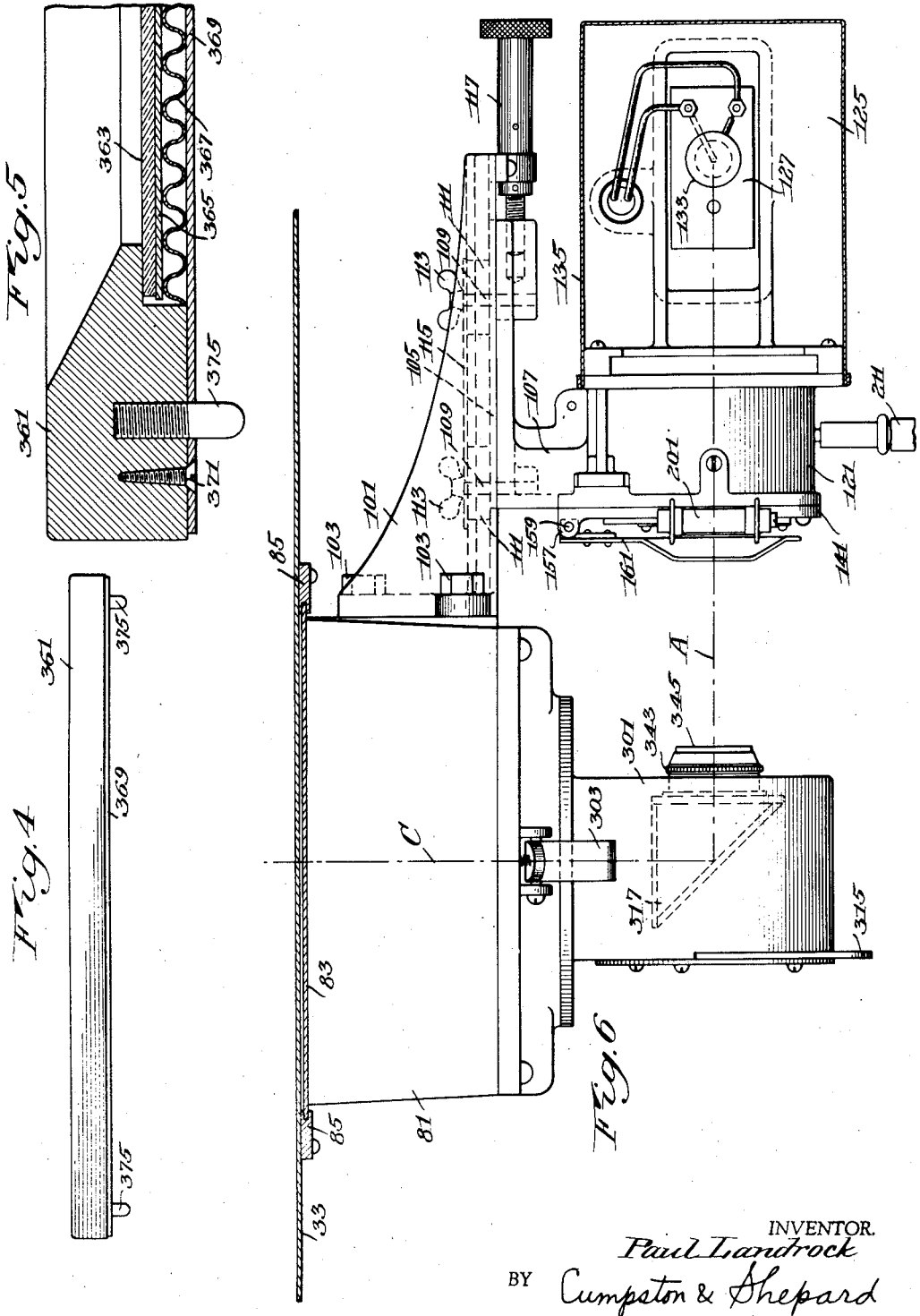
INVENTOR.
Paul Landrock
BY Cumpston & Shepard
his ATTORNEYS Jan. 14, 1941.                P. LANDROCK                2,228,880
                         PHOTOGRAPHIC APPARATUS
                         Filed July 6, 1938        10 Sheets-Sheet 4
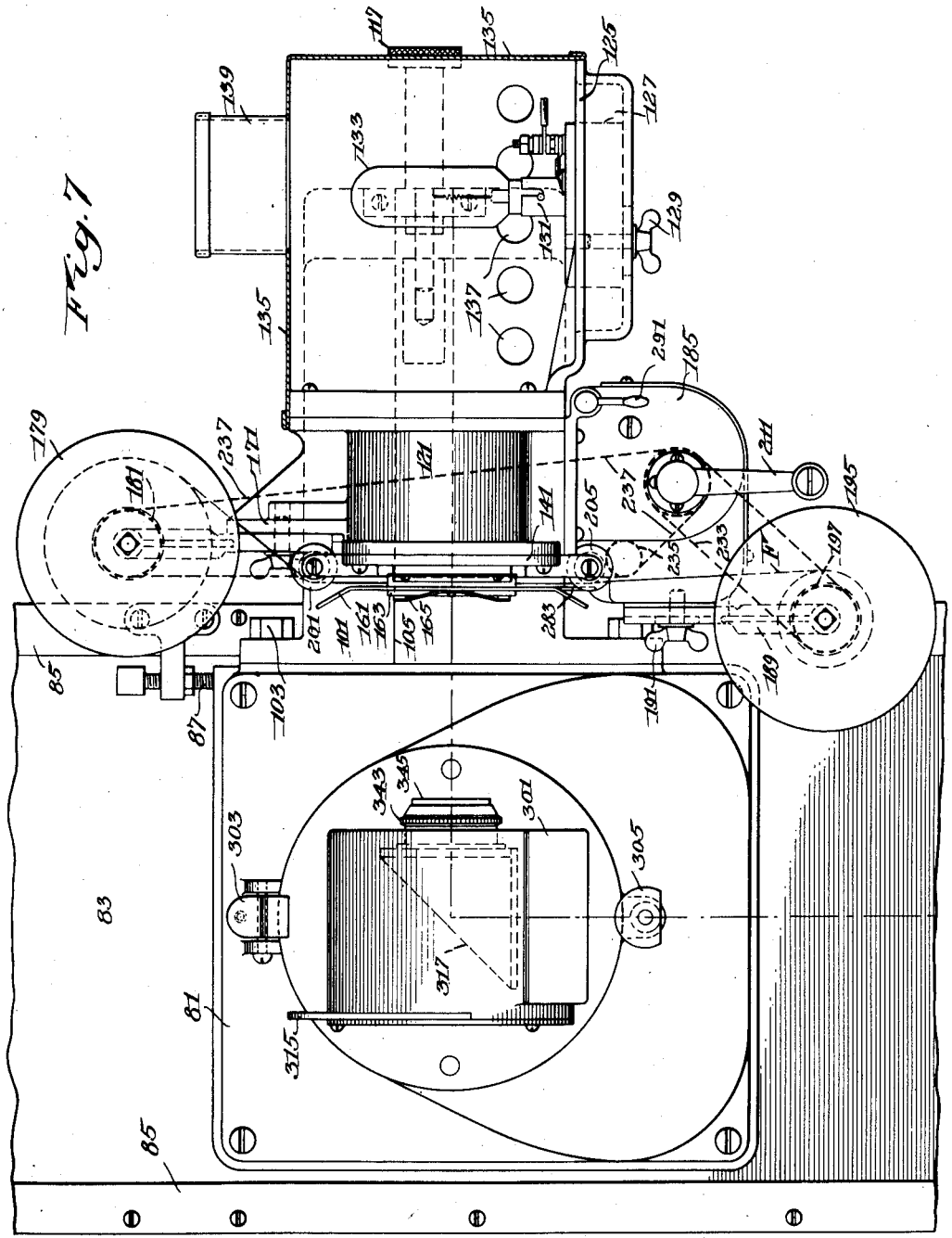
                                              INVENTOR.
                                              Paul Landrock
                                   BY  Cumpston & Shepard
                                              his ATTORNEYS

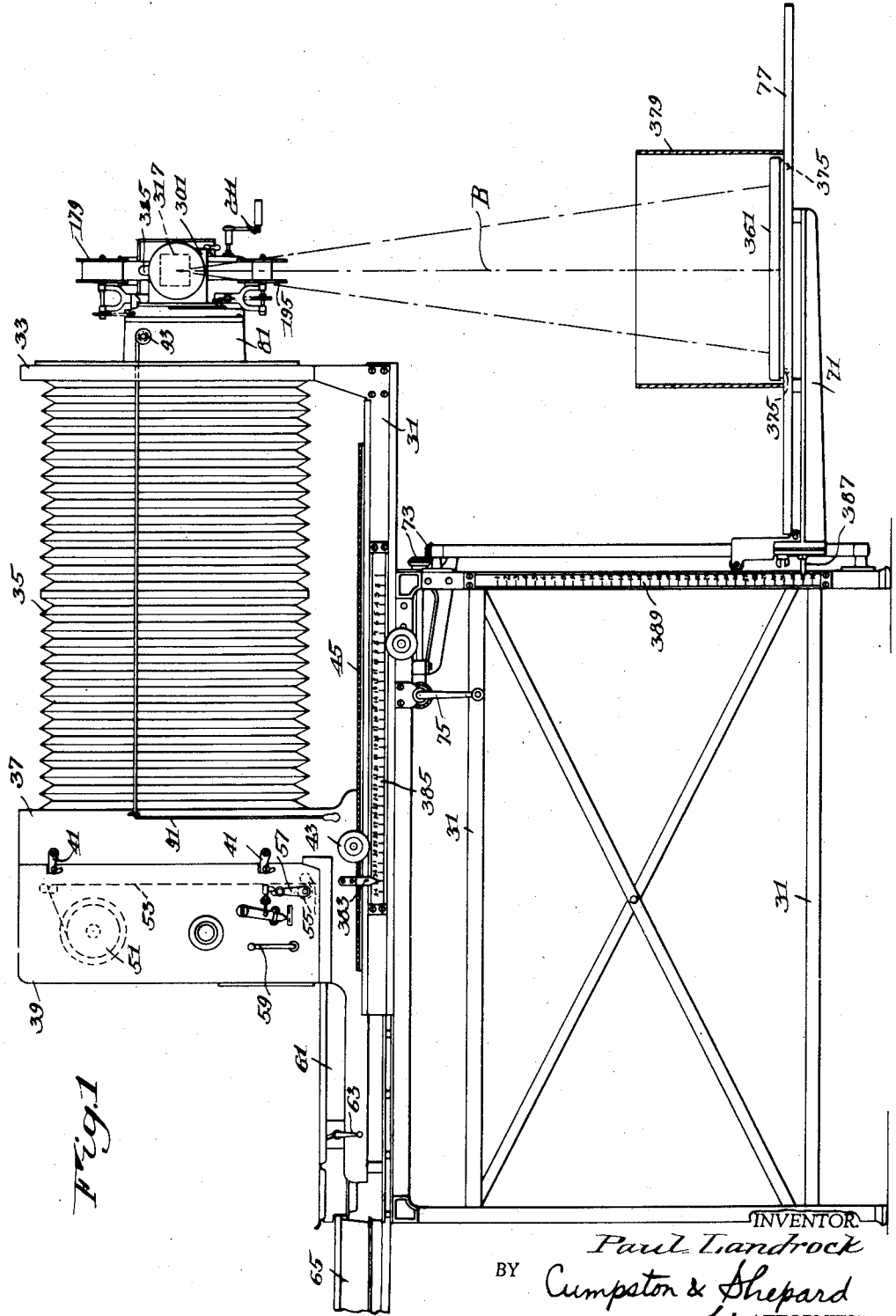

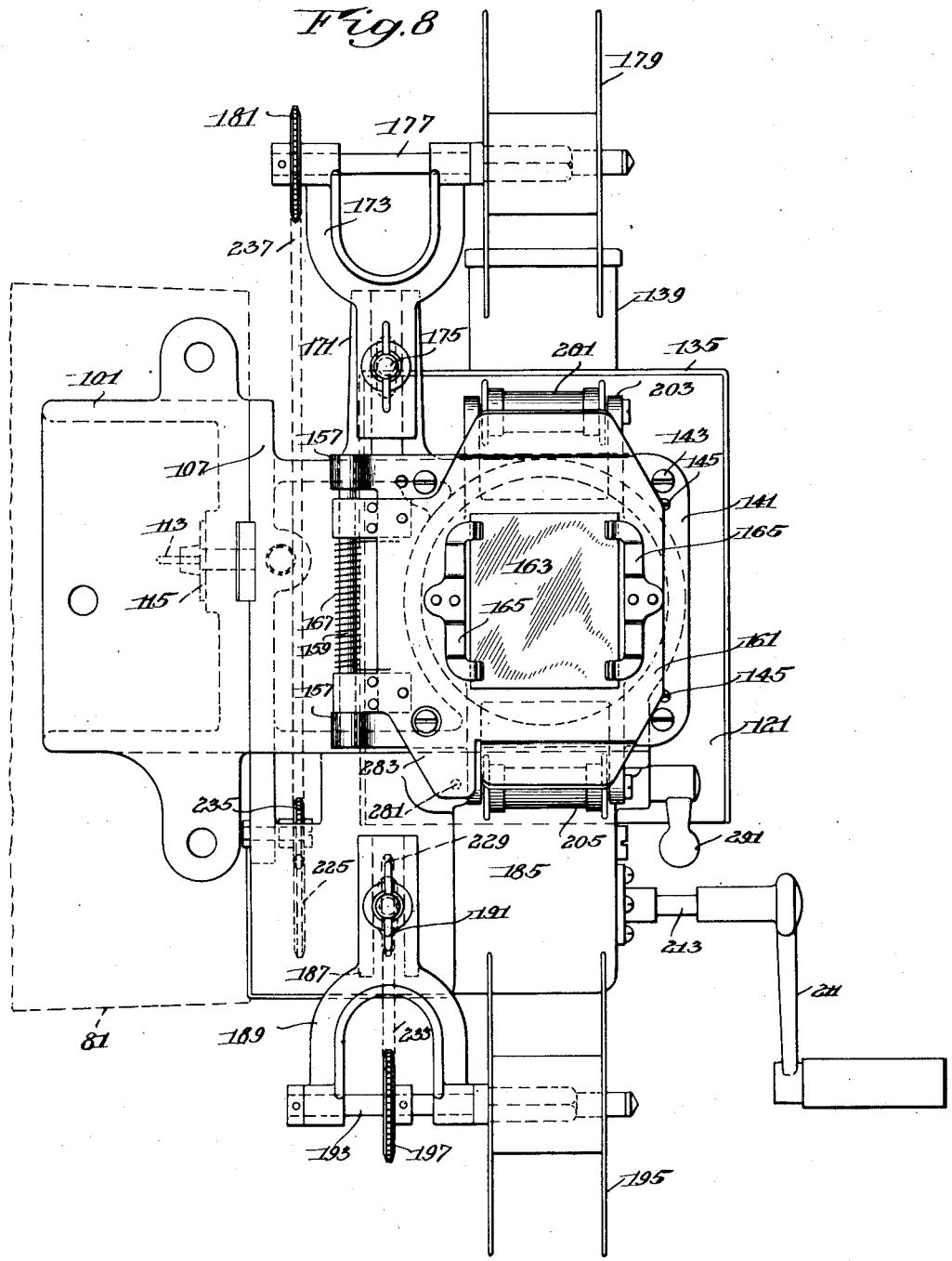

Jan. 14, 1941.                P. LANDROCK                 2,228,880
                         PHOTOGRAPHIC APPARATUS
                    Filed July 6, 1938        10 Sheets-Sheet 6
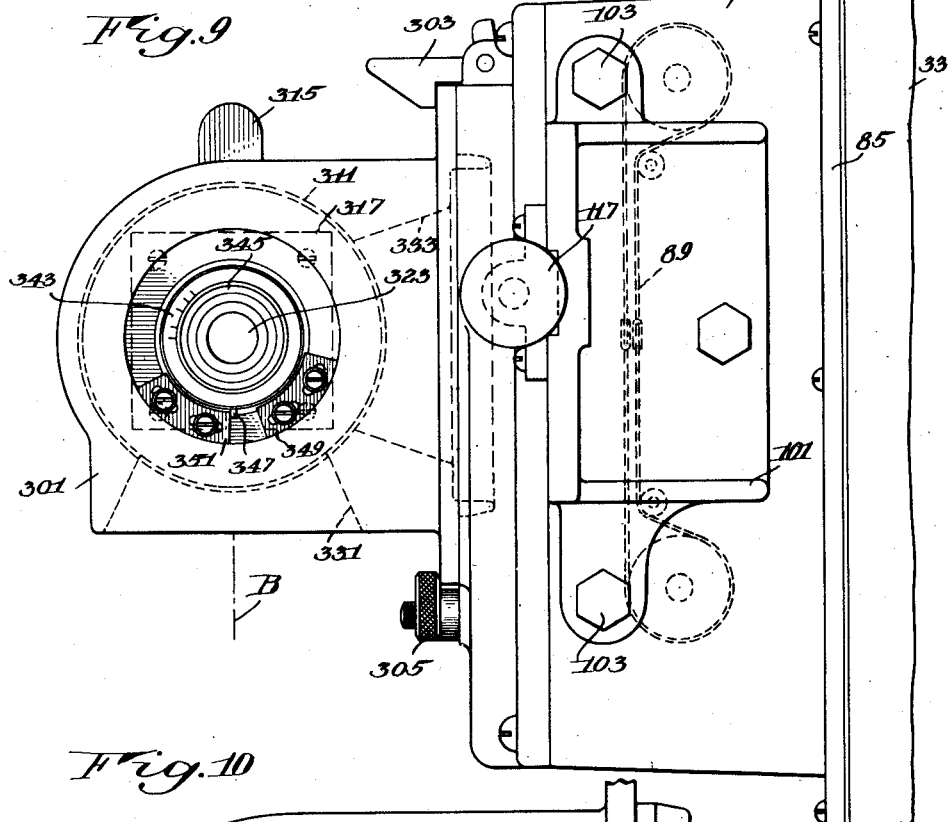
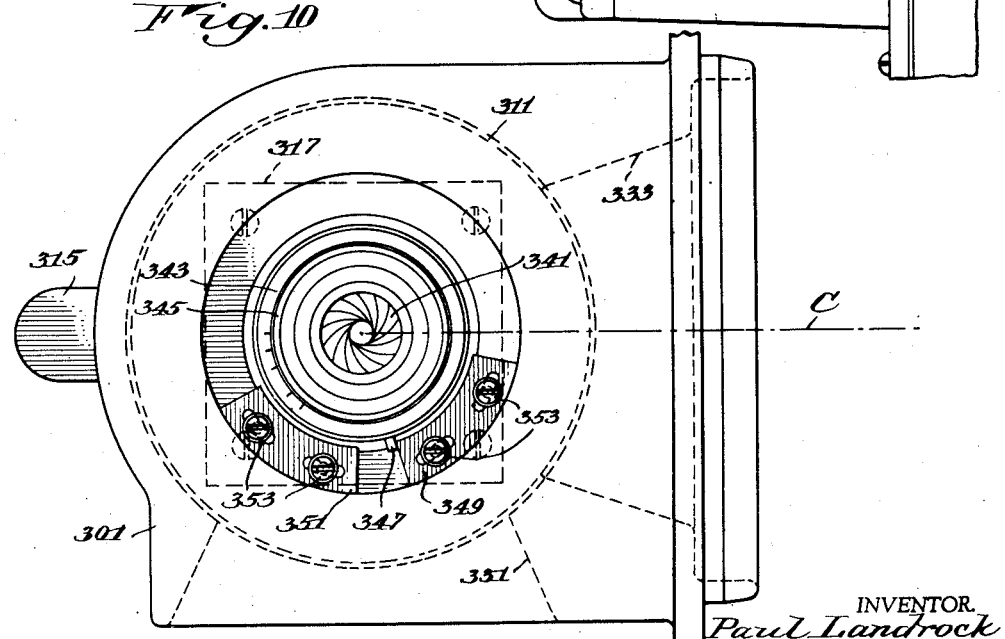
INVENTOR.
Paul Landrock
BY Cumpston & Shepard
       his ATTORNEYS

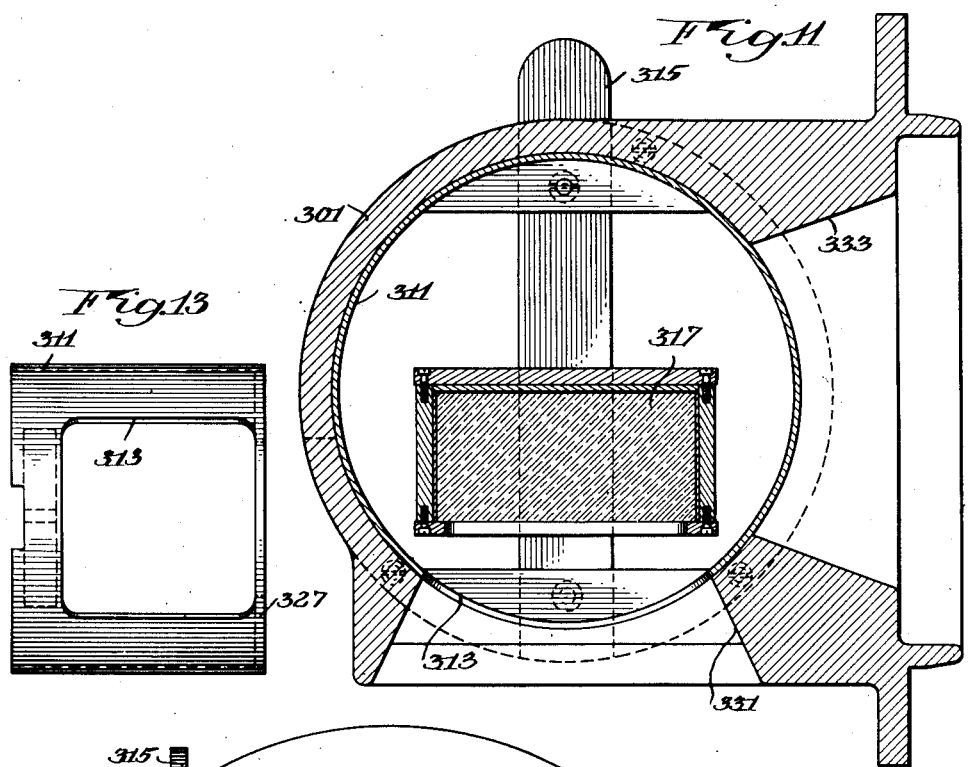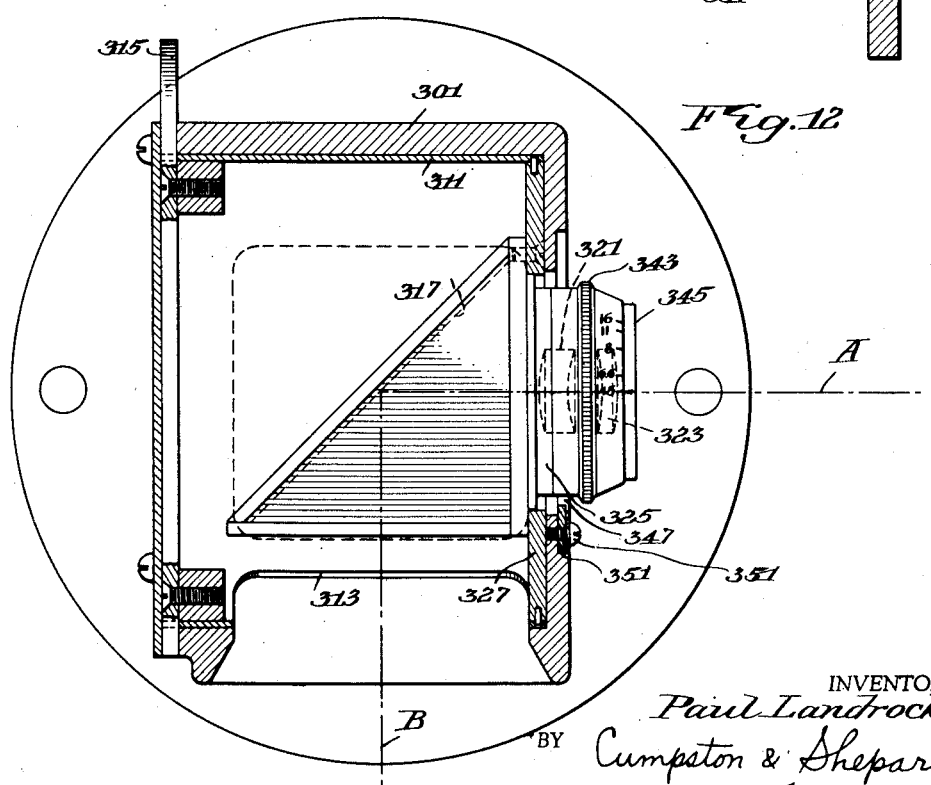

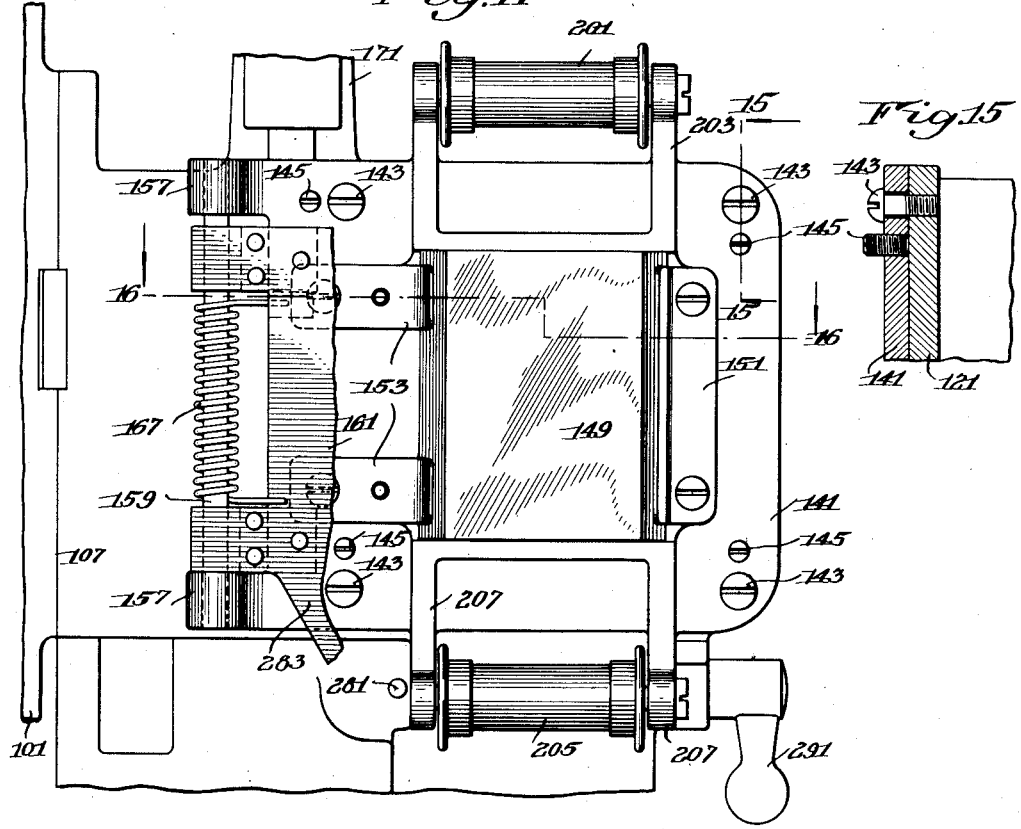
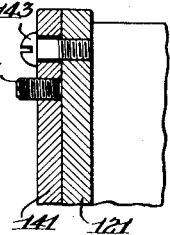
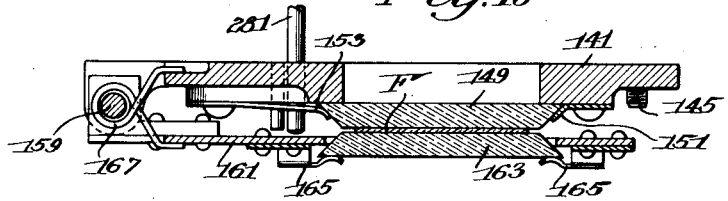
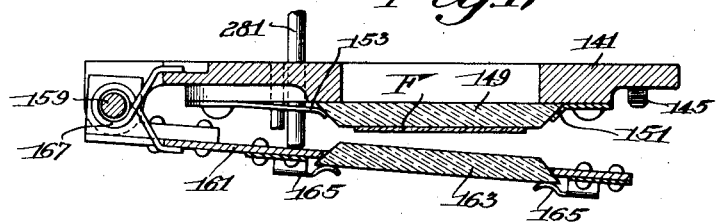

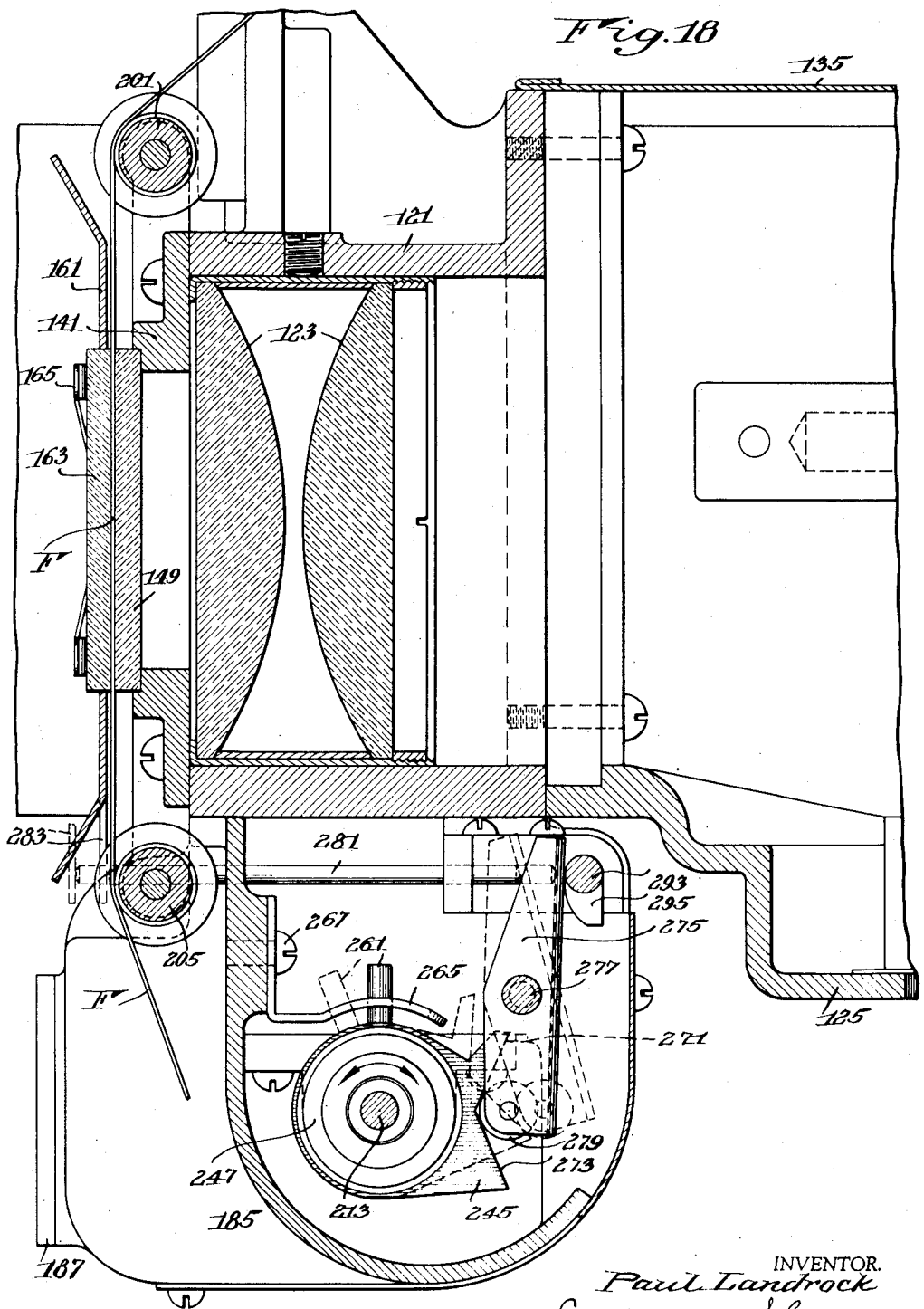

Jan. 14, 1941.   P. LANDROCK   2,228,880
PHOTOGRAPHIC APPARATUS
Filed July 6, 1938   10 Sheets-Sheet 10

INVENTOR.
Paul Landrock
BY Cumpston & Shepard
his ATTORNEYS

Patented Jan. 14, 1941

2,228,880

UNITED STATES PATENT OFFICE 2,228,880

PHOTOGRAPHIC APPARATUS

Paul Landrock, Rochester, N. Y., assignor to Photostat Corporation, Providence, R. I., a corporation of Rhode Island Application July 6, 1938, Serial No. 217,710

17 Claims. (Cl. 88—24)

This invention relates to photographic apparatus, and more particularly to apparatus for viewing an enlarged image of a small transparency and for making an enlarged photographic print of such transparency.

An object of the invention is the provision of improved and simplified apparatus for viewing an enlarged image of a small transparency, whether this transparency be part of a long strip or roll of material, or whether it be a small separate piece, and so designed that when the transparency is part of a strip, successive portions of the strip may be brought quickly into proper position to be enlarged and viewed in rapid succession.

Another object is the provision of such apparatus so designed and constructed that the size of the enlarged image or degree of enlargement thereof can be easily and quickly changed within a wide range.

Another object is the provision of simplified and improved apparatus for making a photographic print which is an enlargement of a small transparency, whether the transparency be part of a strip or roll, or whether it be a separate individual piece, and so designed that when the transparency is part of a strip, successive portions of the strip may be brought quickly into proper position to have enlarged photographic prints of them made.

Another object is the provision of photographic print making apparatus of the kind just mentioned, so designed and constructed that the size of the photographic print or degree of enlargement thereof can be easily and quickly changed within a wide range.

Still another object is the provision of viewing and enlarged print making apparatus so designed and constructed that an enlarged image of the transparency to be reproduced is available for viewing before the photographic enlargement or print is made, so that the operator may read or otherwise note the enlarged image and decide whether or not a photograph is to be made, and having simple means for making the desired photographic enlargement.

Still another object is the provision of apparatus so designed that an enlarged image of a transparency is available for viewing, and a photographic print of such enlarged image may be made if desired, all without the use of a dark room.

A further object is the provision of combined image viewing and photographing apparatus so constructed that an enlarged image on a viewing screen can be transferred to sensitized photographic material to make a photographic print, without the use of a dark room, and in such a way that the image on the sensitized material will be of exactly the same size and focused in exactly the same way as the image on the viewing screen, so that when the image on the viewing screen has been made of the desired size and is properly focused, there will be assurance that the photographic enlargement will be of the same size and will likewise be properly focused.

A further object is the provision of apparatus providing a relatively brilliant image of a transparency on a viewing screen, for ease of reading, and a less brilliant image of the same transparency on sensitized photographic material when a photographic print is to be made, so that a relatively slow exposure may be employed, for more accurate control.

A further object is the provision of simple and effective mechanism for holding a transparency truly flat while light is being projected through it to form the viewing image or the photographing image, and for relieving the flattening pressure on the transparency when it is to be moved, to avoid scratching or other damage to the transparency.

A still further object is the provision of means readily applicable to and removable from existing commercial copying cameras of a known type in wide use, whereby enlarged images of small transparencies may be made for viewing or reading purposes, and whereby such enlarged images may be projected upon sensitized material within the camera to make a photographic print.

A still further object is the provision of an improved viewing screen and an improved shadow box to shield the viewing screen when the surrounding light is strong, to render the image on the viewing screen more readily discernible.

A still further object is the provision of apparatus so designed and constructed that the sze of the image on the viewing screen and size of the image on the photo sensitive material can both be adjusted, in combination with means for locating the viewing screen and the sensitized material in such position that the image on one will be of exactly the same size as the image on the other.

An additional object of the invention is the provision of means for quickly shifting an image of a transparency from a viewing screen to a piece of photo sensitive material, without change in the shape, size, or focusing of such image.

To these and other ends the invention resides in certain improvements and combinations of parts, all as will be hereinafter more fully described, the novel features being pointed out in the claims at the end of the specification.

In the drawings:

Fig. 1 is a side elevation of apparatus constructed in accordance with a preferred illustrative embodiment of the invention, showing the parts in such position that the enlarged image is projected upon the viewing screen;

Fig. 2 is a similar view of a portion of the apparatus shown in Fig. 1, with the parts shifted to a different position so that the enlarged image is projected onto the photo sensitive material in the focal plane of the camera;

Fig. 3 is a plan of the viewing screen assembly;

Fig. 4 is a side elevation thereof;

Fig. 5 is a vertical section through the viewing screen assembly;

Fig. 6 is a plan of a portion of the apparatus, including the light projecting means, transparency holding means, and optical system;

Fig. 7 is a front elevation of the same;

Fig. 8 is a side elevation of the light projecting apparatus, transparency holding and winding means, and related parts;

Fig. 9 is a side view of part of the optical system and the front portion of the camera, with the movable optical parts in one position to project the image upon the viewing screen;

Fig. 10 is a similar view with the optical parts shifted to project the image onto the focal plane of the camera;

Fig. 11 is a vertical section through the optical parts shown in Figs. 9 and 10;

Fig. 12 is another vertical section through the same, taken on a plane at right angles to the plane of Fig. 11;

Fig. 13 is a view of the prism carrier removed from other parts;

Fig. 14 is a side elevation, with parts broken away, of the transparency holding means;

Fig. 15 is a vertical section taken substantially on the line 15—15 of Fig. 14;

Fig. 16 is a horizontal section taken substantially one the line 16—16 of Fig. 14, with the transparency flattening means in effective position;

Fig. 17 is a view similar to Fig. 16 with the transparency flattening means opened to release the transparency;

Fig. 18 is a vertical section through part of the light projecting means, the transparency holding means, and the transparency winding means;

The same reference numerals throughout the several views indicate the same parts.

Figure 19:
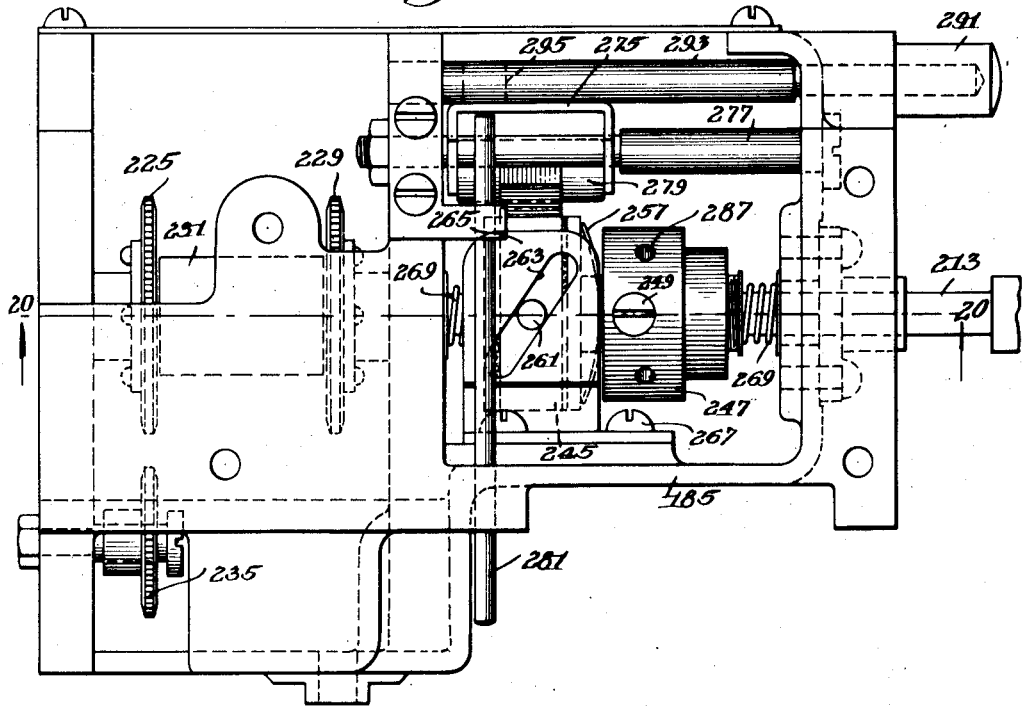
Fig. 19 is a plan of the mechanism shown in the lower part of Fig. 18, with superimposed parts removed for the sake of clearness.

Referring now to the drawings, which show a preferred form of construction constituting an illustrative embodiment of the invention, the machine comprises a stationary frame indicated in general at 31 (Fig. 1) on which is mounted a camera front 33 connected by the usual bellows 35 to a camera body having a forward section 37 and a rear or magazine section 39 hinged to the forward section 37 so that it may be opened when the latches 41 are released.

The camera front and body are adjustable toward and away from each other for purposes of focusing. This may be accomplished by mounting the body stationarily on the frame 31 and by moving the front along the frame, or preferably by mounting the front 33 stationarily on the frame 31, and by moving the body backwardly and forwardly along a track on the frame, by means, for example, of a pinion on the shaft of a hand wheel 43 mounted on the body, which pinion engages a rack 45 on the stationary frame 31.

The front, bellows, and body may be of the same construction as one existing type or style of commercial copying camera known as the "Photostat" camera, which type or style is widely used and well known to those skilled in the art. It includes, within the magazine section 39, means for holding a roll 51 of photo sensitive material such as paper coated with a photographic emulsion, and means for holding a portion of the web or strip of paper flat in the focal plane of the camera as indicated at 53, together with roller means 55 operated by a handle 57 for feeding the sensitized material to draw an exposed portion thereof out of the focal plane 53 and to draw a fresh unexposed portion into the focal plane, and the usual knife means operated by the handle 59 for cutting off the exposed portion of sheet material below the rolls 55, to sever it from the remaining unexposed portion. When the exposed portion is fed downwardly by operation of the rolls, it goes into a tray 61 containing a developing bath, and by operation of a crank handle 63 it may be fed rearwardly out of the developing bath and into a fixing bath in another tray 65, all as well understood by those skilled in this art. The parts 61 and 65 are preferably connected to the camera magazine 39 to move therewith along tracks on the frame 31 when the camera magazine is moved forwardly or rearwardly for focusing.

Mounted for movement upwardly and downwardly along a track at the front end of the frame 31 is a bracket 71 on which various kinds or types of copyholders may be interchangeably mounted. The bracket may conveniently be raised or lowered by means of a long screw driven through beveled gears 73 from the crank 75, in known manner. Among the kinds of copyholder which may be mounted on this bracket 71 for ordinary photocopying operations, is a large board 77, sometimes known as an engineering board, on which documents to be copied may be laid flat, beneath the usual lens and prism assembly (not shown here) employed in copying cameras of this known type.

The camera front 33 carries a housing 81 (Figs. 1, 6, and 9) projecting forwardly from a board 83 (Fig. 6) slidable vertically on the front face of the camera front 33 in guideways formed by grooves in the strips 85. As usual, upward and downward motion of the housing 81 and board 83 is limited by an upper stop 87 (Fig. 7) and by a similar lower stop (not shown), so that when the housing 81 is in its uppermost position, as illustrated in Figs. 1 and 7, the center of the housing is substantially alined with the center of the available area of the focal plane 53, thus enabling the making of full sized prints of the maximum capacity of the machine. If a print of half the size is to be made the housing 81 and its board 83 are moved downwardly into engagement with the lower stop, so that the housing is now centered opposite the lower half of the focal plane area 53, so that the photographic print may be made on the lower half of this area without exposing the upper half thereof.

Within the housing 81 is the usual shutter, preferably but not necessarily in the form of a curtain shutter, as indicated diagrammatically at 89 in Fig. 9. It may be opened by a pull on a cord 91 (Fig. 1) which is connected to a pulley 93 secured to the top shaft of the shutter.

For ordinary photocopying operations, as well understood by those skilled in the art, a lens and prism assembly is secured to the front of the housing 81. Light rays from a suitably illuminated document on the board 77 pass upwardly to such ordinary lens and prism assembly (not shown) and are bent through approximately 90° so as to pass rearwardly (when the shutter 89 is open) through the bellows 35 to fall upon sensitized material 53 in the focal plane, thus exposing it whereupon the exposed material may be fed downwardly and cut off, and treated in the developing bath and fixing bath to make a photographic print.

The present invention provides a special unit to replace the ordinary lens and prism assembly, and also certain supplementary parts used with the special unit, so designed and constructed that an enlarged image of a small individual transparency or of any selected transparency from a long roll or strip, can be projected downwardly onto the board 77 or onto a suitable screen placed thereon, for purposes of viewing, reading, or otherwise examining such image, or can be projected rearwardly onto the sensitized material 53 to make an enlarged photographic print of such transparency, the apparatus of the present invention also permitting successive transparencies (such as successive frames of a motion picture film or a long strip of film) to be brought rapidly in succession to projecting and enlarging position, in order that the desired one or more transparencies in a long strip may be quickly found in a minimum of time.

The word "transparency" and its derivatives, as used in this application, is not intended in a narrow or technical sense, but is intended to include all films, plates, slides, etc., which are rendered visible by light projected through them or parts of them, or from which enlarged images may be made by projecting light through them or parts of them. For instance, the word as here used includes images on motion picture film or other strip film (whether negative or positive) as well as images on glass plates or on relatively thin and transparent paper.

Referring now to Figs. 6 and 7, the preferred illustrative embodiment of the invention includes a bracket 101 detachably secured to the housing 81 by means of removable bolts 103. This bracket 101 has an approximately horizontal guideway 105 forming a track along which is movable a second bracket 107 secured to the bracket 101 by means of the bolts 109 which extend through slots 111 in the bracket 101 and which have wing nuts 113 bearing against a slidable resilient spring plate 115 which covers the slots 111. An adjusting screw 117 mounted for rotation on the bracket 101 but held against axial movement thereon, is screwed into a tapped opening in the bracket 107, so that rotation of the screw 117 moves the bracket 107 in one direction or the other along its trackway 105 on the bracket 101, the wing nuts 113 being left sufficiently loose to allow such adjusting movement. The spring 115 holds the parts tightly together notwithstanding this slight looseness of the wing nuts.

On this bracket 107, and movable bodily therewith, when the bracket is adjusted, is what may be termed the light projecting assembly and the transparency holding assembly. The light projecting assembly includes a somewhat annular or barrel-shaped casing section 121 (Figs. 6, 7, and 18) within which is removably mounted a condensing lens system having condensing lenses of any suitable number and arrangement, two such lenses being shown at 123 (Fig. 18). Extending rightwardly from the condenser casing 121, when the parts are viewed from the front as in Figs. 7 and 18, is a lamp housing having a floor 125 and a lamp block 127 slidable toward and away from the condenser lenses 123 along a groove in the floor, the block 127 being held in any position to which it is set by means of a wing head 129 on a clamping bolt. On the block 127 is a lamp base 131 in which is mounted an incandescent bulb 133, the filament of which is so set (by shifting the block 127 toward or away from the condenser lenses) as to be at the focus of the condensing lens system, to produce a strong beam of parallel light rays to the left of the condensing lens system, in known manner.

Sheet metal side and top walls 135, forming part of the lamp housing, enclose the lamp 133. Air inlet holes 137 are provided in the side walls near their bottom edges, and a stack or chimney 139 extends upwardly above the top wall, so that the air may circulate within the lamp housing to keep the lamp as cool as practicable.

At the left end of the casing section 121 which holds the condensing lenses, there is a plate 141 (Figs. 7 and 14 to 18) secured to lateral flanges on the casing 121 by means of screws 143, and having associated jack screws 145 (Figs. 14 and 15) threaded through the plate 141 and bearing against the member 121. This plate 141 has a large rectangular aperture alined with the optical axis of the condenser lens system, and around the aperture is a seat for a plate 149 of glass or other transparent material, held against the seat by the clips 151 and 153. This plate 149 has lateral edges which may be beveled as shown in Figs. 14 and 16, for cooperation with the holding clips 151 and 153, but the main faces of the plate are preferably plane and parallel to each other. By suitably adjusting the holding screws 143 and the jack screws 145, the plane of the plate 149 may be made truly perpendicular to the optical axis of the condensing lens system, notwithstanding manufacturing inaccuracies.

The plate 141, near its top and bottom edges, is extended rearwardly of the apparatus (to the left when viewed as in Figs. 8 and 14) to provide bosses 157 in which is mounted a substantially vertical pintle 159 forming a pivot for a plate 161 having an aperture in line with the optical axis of the condensing lens system. Extending across this aperture is a transparent plate 163 which may be similar to or a duplicate of the transparent plate 149, likewise having lateral edges which are beveled, the beveled edges preferably being faced toward the edges of the opening in the plate 161, as shown in Figs. 16 and 17. Resilient spring clips 165 (Figs. 8, 16, and 17) secured to the plate 161 approximately midway of their heights, have upper and lower ends overlying the transparent plate 163 and tend to hold the beveled edges of this transparent plate against the lateral edges of the opening in the plate 161 in which the transparent plate is mounted. The extreme width of the transparent plate is greater than the width of such opening, so that the beveled edges seat against the edges of the opening and prevent the transparent plate from moving entirely through the opening.

A spring 167 is coiled around the pintle 159, with one end of the spring engaged against the stationary plate 141 and the other end engaged against the plate 161 in a direction to tend to swing the plate 161 flat against the plate 141, thus tending to bring the opposed faces of the two transparent plates 149 and 163 into contact with other or to bring them against an interposed film or other transparency indicated at F in Fig. 16. The strength of the spring 167 is preferably somewhat greater than the strength of the spring clips 165, so that the plate 161 is closed against the plate 141 with sufficient force to displace the spring clips 165 slightly, thus insuring that the plate 163 will seat evenly against the interposed transparency F throughout the entire width thereof, irrespective of variations in the thicknesses of different transparencies, within reasonable limits.

If only a part of the whole image on the transparency interposed between the plates 149 and 163 is to be projected and enlarged, then an opaque mask with an opening of the appropriate size, may be placed on that surface of the plate 163 which is remote from the transparency F, the edges of the mask being slipped under the ends of the spring clips 165, to hold the mask in place. It is but the work of an instant to take out one mask and insert another mask having a different sized opening.

When the image to be projected and enlarged is on an individual transparency, the glass plates 149 and 163 are separated from each other by swinging the plate 161 on the pintle 159 against the tension of the spring 167, and the transparency is placed between the two glass plates, whereupon the glass plates are brought together again, to clamp the transparency between them in order to hold the transparency frictionally in place. The same procedure may be followed when the transparency to be projected is one of a series of images on a short strip of film, too short to be reeled and handled in the manner of a long roll or strip. But when the transparency constitutes one "frame" or image on a long strip such as a roll of motion picture film or similar film for use in a still camera, then means is provided for handling the roll of film and for moving it quickly past the optical axis of the condensing lens system, to bring any selected image into proper projecting position.

This strip film or roll film handling means includes a bracket 171 extending upwardly from the top of the condenser housing 121, and a Y-shaped bracket 173 (Fig. 8) mounted on the bracket 171 and slidable vertically thereon for purposes of adjustment, being held in adjusted position by the clamp screw 175. In the bracket 173 is journaled an approximately horizontal shaft 177 the forward end of which is of the usual partly square and partly circular periphery, as indicated in Fig. 8, to receive a film reel 179 of any usual construction. A sprocket 181 is fixed to the rear end of the shaft 177.

Secured to the bottom of the condenser lens housing 121 and extending downwardly therefrom is a housing or casing 185 (Figs. 7, 8, and 18) one face of which is provided with an approximately vertical guideway 187 for receiving a Y-shaped bracket 189 similar to the bracket 173, but inverted with respect thereto. The bracket 189, like the bracket 173, is adjustable along its guideway and is held in any adjusted position by a clamping bolt 191. Mounted in bearings in this bracket 189 is a shaft 193 similar to the shaft 177 and likewise having a forwardly projecting end which is partly circular and partly squared, to receive a film reel 195 which is alined with the reel 179, as shown in Fig. 8, both lying in the same plane perpendicular to the shafts 177 and 193, although the two reels may be somewhat offset from each other horizontally in a direction transverse to their shafts, as indicated in Fig. 7. The shaft 193 carries a sprocket 197 (Fig. 8) similar to the sprocket 181 but lying in a different plane perpendicular to the shaft 193 from the plane of the sprocket 181, the sprocket 197 preferably being mounted between the two arms of the bracket 189.

A strip of film wound on the upper reel 179 may extend downwardly therefrom and over a guide roller 201 (Figs. 7, 8, 14, and 18) rotatably mounted on arms 203 extending upwardly from the plate 141, the film then passing from this guide roller downwardly between the transparent plates 149 and 163 and contacting with another guide roller 205 similarly rotatably mounted on arms 207 extending downwardly from the plate 141, from which lower guide roller the film F may extend to the lower reel 195.

The strip of film may be advanced in one direction or the other by turning the appropriate reel 179 or 195 by direct hand pressure, but it is preferable to provide convenient crank means for driving one reel or the other at will, and it is also preferable that mechanism be provided for automatically opening the transparent plates 149 and 163 to relieve the pressure on the film when it is being moved. Such mechanism preferably includes a readily accessible crank 211 (Figs. 1, 7, and 8) mounted on a shaft 213 journaled in the previously mentioned housing 185 and arranged approximately parallel to the shafts 177 and 193. The shaft may be mounted in a ball bearing 215 (Fig. 20) in a rear wall of the housing 185, and a ball bearing 217 in an intermediate partition thereof, and a plain bearing 219 on the front wall of the housing. The shaft is mounted for limited axial movement in its bearings so that, when the shaft is moved axially in one direction or the other, a toothed driving element 221 (Fig. 20) pinned to the shaft can be brought into engagement either with the tooth 223 secured to a sprocket 225, or with a tooth 227 secured to a sprocket 229, both of these sprockets being rotatably mounted on the shaft 213 and being held against lateral movement relatively to the casing 185, by hubs engaging the parts 215 and 217, and by a spacing sleeve 231 interposed between the sprockets.

When the shaft 213 is moved forwardly of the apparatus (to the right when viewed as in Figs. 8 and 20) the driving element 221 is engaged with the tooth 227 on the sprocket 229, and turning the crank 211 in a clockwise direction when viewed as in Fig. 7 will drive the sprocket 229 in a corresponding direction. The sprocket 229 is alined with the sprocket 197 on the shaft 193, and connected thereto by a drive chain 233 (Figs. 7 and 8) so that the shaft 193 and the reel 195 will be driven from the sprocket 229.

Likewise, when the shaft 213 is moved axially in a rearward direction (to the left when viewed as in Figs. 8 and 20) this engages the driving element 229 with the tooth 223 on the sprocket 225, and if the crank 211 be turned in a counterclockwise direction when viewed as in Fig. 7, this will drive the sprocket 225 in a corresponding direction. The sprocket 225 is alined with the sprocket 181 on the shaft 177 and with an idler or guiding sprocket 235 (Figs. 7 and 19) and a drive chain 237 (Figs. 7 and 8) runs over this sprocket to drive the sprocket 181 and the reel 179 from the sprocket 225.

Figure 20:
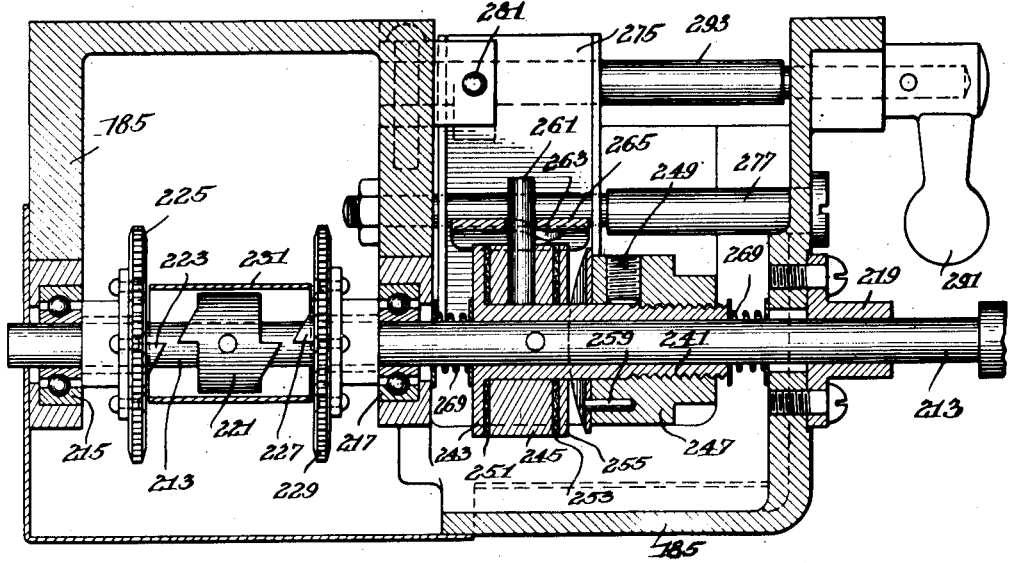
Fig. 20 is a vertical section taken substantially on the line 20—20 of Fig. 19.

In order to move the shaft 213 axially in the proper direction when the crank 211 is rotated, and in order also to open the transparent plates 149 and 163 so they will not bind on the film, the following mechanism is provided, referring now to Figs. 18, 19, and 20. Fixed to the shaft 213 is a sleeve 241 having an outwardly extending annular flange 243 at its rear end. A collar 245 is rotatably mounted on the sleeve 241 between the flange 243 and another collar 247 which is internally threaded and screwed onto a thread on the end of the sleeve 241 remote from the flange 243, and which is held against rotation on the sleeve by a set-screw 249. A layer of friction material 251, such as a fiber washer, or brake lining, or similar material, is interposed between the flange 243 and the adjacent face of the collar 245, and a layer of similar friction material 253 is interposed between the opposite face of the collar 245 and an annular plate 255 surrounding the sleeve 241 and constantly pressed toward the collar 245 by means of a curved spring plate 257 mounted between the plate 255 and the collar 247. A pin 259 prevents the spring plate 257 from turning relatively to the sleeve 241 and collar 259.

The collar 245 has fixed to it an approximately radial pin 261 which extends upwardly from the top of the collar and into an oblique slot 263 in a bracket 265 stationarily mounted in the casing 185 as by means of screws 267 (Fig. 18). Due to the oblique inclination of the slot 263, any turning of the collar 245 will cause this collar to be cammed in a direction axially of the shaft 213. The length of the slot 263 and the oblique inclination thereof is so designed with respect to the distance between the teeth 223 and 227 on the sprockets 225 and 229, that when the shaft 213 is turned in a clockwise direction (when viewed from the front as in Fig. 7) the resultant turning of the collar 245 will, shortly before the pin 261 comes to the corresponding end of its slot 253, move the shaft 213 sufficiently far forwardly to engage the driving member 221 with the tooth 227 on the sprocket 229. Similarly, if the shaft 213 be rotated in a counterclockwise direction, the pin 261 will ride in the opposite direction along the slot 263 sufficiently far to engage the driving member 221 with the tooth 223 on the sprocket 225. Axial movement of the shaft 213 in either direction is resisted but not prevented by the coiled springs 269 which surround the shaft at opposite ends of the sleeve 241 and which constantly tend to return the shaft 213 axially to its central position when it has been displaced in either direction therefrom.

The collar 245 has an extension on one side thereof, which extension is provided with cam faces 271 and 273 (Fig. 18) inclined toward each other and together forming a shallow V-shaped notch. A lever 275, having a generally U-shaped cross section as seen in Fig. 19, is fulcrumed near its midpoint on a shaft 277 and carries near its lower end a roller 279 engaged in the notch formed by the surfaces 271 and 273 of the collar 245. The upper end of the lever lies against one end of a thrust pin 281 mounted for axial movement in the housing 185. The opposite end of the thrust pin 281 bears against an ear 283 (Fig. 8) on the hinged plate 161 on which the glass plate 163 is mounted. When the collar 245 is turned in either direction from its neutral or central position shown in full lines in Fig. 18, one of the surfaces 271 and 273 will thrust against the roller 279 to swing the lever 275 in a counterclockwise direction about its fulcrum 277 to some such position as that shown in dotted lines in Fig. 18. This will cause the upper end of the lever 275 to thrust against the pin 281, moving the pin longitudinally and thus pressing the hinged plate 161 to open the transparent plate 163 away from the plate 149, against the tension of the spring 167.

The parts are so arranged that this opening of the presser plates 149 and 163 will take place before the winding of the film commences, so that the flattening pressure on the film is relieved before the film begins to move. In other words, the various cams and parts above mentioned are so designed that, upon commencing rotation of the shaft 213 in either direction, the turning movement of the collar 245 will first swing the lever 275 to open up the transparent plates 149 and 163, before the turning of the collar 245 has progressed sufficiently far to move the shaft 213 axially to a sufficient extent to drive the sprocket 225 or the sprocket 229. After the initial slight turn of the shaft 213 sufficient to move the presser plate 163 and sufficient to engage one of the sprockets 225 and 229, further or continued rotation of the shaft 213 will cause the sleeve 241 to slip relatively to the collar 245, which collar will be held against further rotation by engagement of the pin 261 with the end of its slot 263, and so long as the turning of the shaft 213 continues, the collar 245 will be maintained in its displaced position, with the presser plate 163 held away from the plate 149, and with the driving connection established between the member 221 and one of the sprockets 225 and 229. So long as the driving of the film reels continues the presser plate 163 can never press against the moving film and cause scratching or damage to the film, because any return of the collar 245 toward its central position sufficiently far to release the pin 281 and allow the plate 163 to press against the film, would necessarily move the shaft 213 axially sufficiently far to disengage the driving connection between this shaft and the sprocket 225 or 229.

If it is found that the friction between the sleeve 241 and the collar 245 is too small or too great, it may readily be adjusted by loosening the set-screw 249 and turning the collar 247 on its threads on the sleeve 241, until the proper degree of frictional drag on the collar 245 is obtained, whereupon the set-screw 249 may be tightened. Radial holes 287 (Fig. 19) may be placed in the collar 247, to be engaged by an adjusting pin for the purpose of turning this collar on the sleeve 241 when required.

It is desirable also to have means for relieving the pressure of the plate 163 on the film or other transparency, whenever it is desired to do so, without necessarily turning the crank 211 and shaft 213. This may be accomplished by turning a handle 291 (Figs. 7, 8, and 20) on a shaft 293 (Figs. 18, 19, and 20) carrying a cam arm 295 arranged to cooperate with the upper end of the lever 275. Normally the handle 291 hangs straight downwardly as indicated in Figs. 7 and 8, and the cam arm 295 likewise extends downwardly as in Fig. 18, having no effect on the lever 275. If the handle 291 be turned approximately 90° in a clockwise direction from its normal position shown in Fig. 7, this will turn the cam arm 295 90° from the position shown in Fig. 18, which will move the upper end of the lever 275 leftwardly, thrusting against the pin 281 and opening the presser plate 163 away from the plate 149, in exactly the same way as though the lever 275 had been operated by the roller 279 riding on the surface 271 or 273. A flat spot on the end of the cam 295 will lie flat against the surface of the lever 275 and tend to hold the cam in its fully operative position when once it is placed therein, until it is forcibly moved back toward its neutral position.

By use of this handle 291, the presser plate 163 can be released from the plate 149 whenever desired (without reference to turning the crank 211) so that, if the transparency to be projected is not of a character to be wound on the reels 179 and 195 and moved by turning the crank 211, the pressure on the transparency may nevertheless be relieved whenever desired, in order to place the transparency in or remove it from the projecting unit. The handle 291 is also used when threading a strip of film through the machine.

The transparency holding and light projecting assembly above described is preferably mounted in such position that it projects the light rays through the transparency and along an optical axis which is approximately horizontal and which intersects the main horizontal optical axis of the camera at approximately a right angle thereto. At the intersection of these axes there is placed a lens and prism assembly, which will now be described with special reference to Figs. 6, 7, and 9 to 13, inclusive.

The lens and prism assembly includes a casing 301 removably mounted in a light-tight manner on the front of the housing 81 as by means of a releasable spring latch 303 near its top and a nut 305 near its bottom. This casing 301 is so shaped as to fit over the usual opening in the front of the housing 81 and to be interchangeable with the usual lens and prism assembly, well known in the art and not here shown, which is customarily used with "Photostat" copying cameras of this type. Thus the usefulness of the camera as an ordinary commercial copying camera is not destroyed by the use of the present invention, for the special lens and prism assembly of the present invention may be removed whenever desired and the standard lens and prism assembly for normal photographing operations can be substituted, thus putting the camera back in condition to be used for ordinary commercial copying operations.

The special lens and prism assembly of the present invention comprises, within the casing 301, a rotatable sleeve or barrel 311, shown separately in Fig. 13, one side of which is cut away as at 313. An arm 315 fixed to this sleeve 311 extends radially outwardly through a slot in the casing 301 to an accessible position so that, by grasping the projecting end of the arm, the sleeve 311 may be turned in the casing 301 through 90° about an axis coinciding with the optical axis of the light projecting assembly above described. The ends of the slot through which the arm 315 extends serve as stops to limit the turning movement of the sleeve.

Mounted stationarily within the sleeve 311 to turn bodily therewith when the sleeve is turned, is suitable light bending means, such as a mirror, or preferably, a prism 317, so arranged that light rays approaching the bending means from a lateral direction (along the axis of the light projecting assembly) will be bent through approximately 90° and will issue in a direction toward the cut out side 313 of the sleeve 311. Associated with this light bending means is a suitable lens system, the details of which form no part of the present invention, any suitable lens system of known form adapted to the requirements of the size of the camera being usable. The lens system may be made up of one or more lenses or compound lenses, one lens being indicated in Fig. 12 at 321 and another at 323. They are mounted in a lens tube 325 which extends out through a lateral opening in the casing 301 as shown, and which is fixed to the sleeve 311 (or to a transverse plate 327 which is in turn fixed to the sleeve) so as to turn bodily therewith.

When the parts are in the position shown in Figs. 7, 9, 11, and 12, the cut out portion 313 of the sleeve 311 is faced downwardly, opposite an opening 331 in the bottom of the casing 301. In this position, light projected through the transparency held between the plates 149 and 163 will pass along the optical axis indicated at A, will enter the special lens and prism unit, and will be bent by the light bending means 317 so as to pass downwardly along the optical axis indicated at B, toward the copyholder 77 or a screen placed thereon as indicated in Fig. 1. In this position, no light enters the camera.

If the parts be turned 90° from this position, to the other position illustrated in Figs. 2, 6, and 10, then the cut out portion 313 in the sleeve 311 will no longer be opposite the opening 331 in the bottom of the casing 301, but will be opposite another opening 333 in the rear of the casing. The light projected through the transparency will now enter the light bending unit as before, but instead of being projected downwardly along the optical axis B, it will now be projected rearwardly, through the opening 333 and into the camera, along the optical axis indicated at C, and will fall upon the photo sensitive material 53 in the focal plane of the camera during such time as the shutter 89 is open. Thus, by manipulating the lever 315 which controls the position of the sleeve 311, it is possible to project the image of the transparency either downwardly onto the copyholder or a viewing screen mounted thereon, or rearwardly into the camera and onto the photo sensitive material therein. By turning the adjusting screw 117, focusing may be accomplished so that a sharp image is obtained on the viewing screen, and means is provided, as described below, for placing the focal plane of the camera at the same distance from the light bending unit as the viewing screen, thus insuring that when an image properly focused on the viewing screen is transferred to the photo sensitive material, it will be equally well focused thereon.

It is seen that the lens and prism, collectively, may be properly described as a catadioptric unit, or as catadioptric media, since the lenses 321 and 323 produce refraction of light rays, while the prism 317 produces reflection of light rays. The same identical catadioptric unit or catadioptric media is employed both in projecting light onto the viewing screen and in projecting light onto the sensitized sheet material or film, thus eliminating errors which might be caused by the use of different optical parts for projecting the light rays along the two different paths.

It is desirable, but not essential, to provide an adjustable iris diaphragm in connection with the lens, and if such a diaphragm is employed, it is also desirable, though not essential, to have this diaphragm automatically operated to open it wider when the light rays are projected downwardly onto the viewing screen than when the light rays are projected rearwardly onto the focal plane of the camera. In the preferred construction, the iris diaphragm, of any suitable known construction, is indicated in Fig. 10 at 341. The diaphragm leaves may be placed, for example, either in front of the first lens 323, or in the space between this lens and the second lens 321. The blades are opened and closed in known manner by turning the usual adjusting ring 343, operatively connected to the diaphragm blades and mounted for rotation around a central tube 345 which is stationary with respect to the lenses. In the preferred construction, a pin 347 (Figs. 9 and 10) projects radially from the adjusting ring 343 and lies in the plane of two adjustable stops 349 and 351 mounted on the side wall of the casing 301 and adjustable through a limited range upon loosening the holding screws 353.

When the sleeve 311 is in the position shown in Figs. 9, 11, and 12, to project light downwardly along the axis B, the iris diaphragm is wide open to its maximum position, with the pin 347 in contact with the stop 351. As the sleeve 311 and handle 315 are turned in a counter-clockwise direction from the position shown in Fig. 9 to the position shown in Fig. 10, to project light along the axis C, the adjusting ring 343 and pin 347 tend to turn with the other parts, and may do so through a limited range, until the pin comes into contact with the other stop 349. Then further turning movement of the adjusting ring 343 is prevented, although the other parts 311 and 345 continue to turn, so that a relative turning takes place between the adjusting ring and the other parts on which the iris diaphragm is mounted, with the result that the iris diaphragm is partially closed as indicated in Fig. 10. When the sleeve 311 is turned back to the position shown in Fig. 9 to project light once more along the axis B, the adjusting ring turns with the other parts until the pin 347 comes in contact with the stop 351, which prevents further movement of the adjusting ring and thus opens the iris diaphragm as movement of the other parts continues.

The purpose of this opening and closing of the diaphragm is twofold. First, it is usually desirable when making a photographic print with this type of camera, to make a relatively long exposure, usually of several seconds duration, in order that the exposure time may be more accurately controlled and that small variations therein may be of less consequence in causing under exposure or over exposure. It is seen that when the proper length of exposure for a given emulsion and given lighting conditions is eight seconds, accidental variation of one second is of much less consequence than the same variation of one second in an exposure which should be of only two seconds duration. Partially closing the diaphragm when the exposure is to be made increases the necessary time of exposure, over what it would be if the diaphragm remained fully open, thus adding to the ease of control of the exposure as above explained. At the same time, it is desirable that the diaphragm be as wide open as possible when the light rays are projected onto the viewing screen, in order to get as brilliant an image as possible for viewing or inspection purposes. The change in the diaphragm setting, preferably made automatically as above explained, thus enables the maximum brilliance of image on the viewing screen, while at the same time providing a relatively slow exposure, the time of which can be more easily controlled than if the image projected onto the photo sensitive material were of the same brilliance as that projected onto the viewing screen.

The second reason for stopping down or partially closing the diaphragm when making an exposure, relative to its position when projecting on the viewing screen, is that this procedure increases the depth of focus when the image is projected into the camera with respect to the depth of focus when the image is projected on the viewing screen, and thus greatly improves the focusing characteristics of the apparatus. The depth of focus of any given lens or lens system, when the focal length remains constant, varies inversely with the aperture. Consequently, when the iris diaphragm is stopped down to reduce the aperture of the lens system, the depth of focus thereof is correspondingly increased. As explained below, means is provided for placing the focal plane 53 at the same distance from the lens and prism assembly as the viewing screen. If the depth of focus of the optical system when focused upon the viewing screen is less than when focused upon the focal plane 53 placed at the same distance as the viewing screen, it follows that if the image is not exactly perfectly focused on the viewing screen, it will nevertheless be sharper and better focused when it is transferred to the sensitized material on the focal plane 53, because of the increase in the depth of focus caused by the decrease of the aperture or diaphragm opening. With this arrangement, it is not necessary to take the highest degree of care in focusing the image on the viewing screen, because so long as the image is reasonably well focused on the viewing screen, it will be focused more sharply and perfectly satisfactorily on the photo sensitive material in the camera when the photo-print is made.

When the image of the transparency is to be focused in a position to be viewed or read, it may, as stated, be focused directly on the flat copyholder 77 (Fig. 1) but it is preferable to use a viewing screen such as shown in Figs. 3, 4, and 5. In its preferred form, the viewing screen includes a rectangular frame 361 in which is mounted a glass plate 363 on the bottom surface of which is the screen itself, indicated at 365, of any suitable known kind (preferably fabric) found to be useful in receiving projected images. Suitable resilient means, such as corrugated fiber board 367, is placed beneath the screen 365 to hold it up tight against the glass 363, and the corrugated board 367 is backed up by a stiff bottom plate 369 secured to the frame 361 as by screws 371.

In order to locate this screen properly on the board 77 in position centered beneath the lens and prism unit, the screen assembly preferably has a plurality of downwardly projecting pins 375, four of them being indicated in Fig. 3, which fit loosely into holes in the top of the board 77, so placed that the screen is properly centered beneath the prism when the pins are in the holes.

If the apparatus is used in a room where there is considerable general illumination, it may be advisable, in order to make the image on the screen somewhat clearer, to employ a shadow box 379 (Fig. 1) around the screen assembly. This shadow box comprises four walls of sheet metal or other suitable stiff opaque material, hinged to each other at their ends to form a parallelogram which can be erected into a rectangle or collapsed into flat form. When erected into rectangular form, the shadow box is placed around the screen frame 361 with the lower edges of the box resting on the board 77, and with the side walls projecting upwardly for a substantial distance around the viewing screen so as to help in keeping stray light off the screen without interfering with the light purposely projected onto the screen as indicated in Fig. 1.

In order to enable the focal plane 53 of the camera to be placed easily and quickly at exactly the same distance from the lens and prism unit as the viewing screen 365, the camera body is provided with a pointer 383 cooperating with a graduated scale 385 on the frame 31, and the adjustable bracket 71 is provided with a pointer 387 cooperating with a graduated scale 389 on the frame. According to the present invention, it is immaterial in what units the scales 385 and 389 are graduated, whether they be linear units of measure, in inches, in centimeters, or other units, or whether they be graduated according to any arbitrary or fanciful scheme, so long as each scale is provided, according to the present invention, with letters, numbers, signs, or other indicia indicating corresponding positions on the two scales which will provide equal distances of the focal plane 53 and the screen 365 from the axis of rotation of the lens and prism unit. In other words, any suitable series of numbers, letters, marks, signs, or other indicia can be placed on the scale 385 within the scope of the present invention, so long as the same series of indicia is placed on the scale 389 in corresponding positions so that when the pointer 383 is set to a given letter, number, etc., on the scale 385, a setting of the pointer 387 at the same letter, number, etc., on the scale 389 will place the screen 365 at the same distance from the lens and prism as the distance between the photo sensitive material 53 and the lens and prism.

Numerals reading in linear units of measure (such as inches) constitute the preferable form of graduations of the scales 385 and 389, but other forms of graduation may be employed within the scope of this invention, as above explained.

In use, the desired transparency is placed between the transparent plates 149 and 163 in the position indicated at F in Fig. 16, and light from the incandescent bulb 133 is projected through the condenser lens system 123 and through the transparency F, along the optical axis A, and into the lens and prism unit as indicated, for example, in Figs. 6 and 12. If the lens and prism unit is in the position indicated in Figs. 1, 11, and 12, the light rays will be bent by the light bending means 317 and will pass downwardly along the optical axis B and will fall upon the viewing screen 365 (Fig. 5) held in the frame 361 (Fig. 1) on the copyholder 77.

The image of the transparency may be focused sharply on the viewing screen by turning the adjusting screw 117 (Fig. 6) to move the light projecting and transparency holding unit closer to or farther away from the lens and prism unit. Since the focal length of the lens system in this lens and prism unit is preferably relatively short, only a slight movement of the light projecting and transparency holding assembly is needed to focus for widely different locations of the viewing screen.

If it is desired to make the image larger, the viewing screen is moved downwardly by moving the bracket 71 down along the track at the front of the frame 31. Similarly, if a smaller image is desired, the viewing screen is moved upwardly closer to the lens and prism unit, the image being refocused by the screw 117 after each change in the position of the viewing screen.

If only part of the subject matter of the transparency is desired to be reproduced in the photographic print to be made, a mask of the suitable size and shape to cover the part not wanted, is placed over the face of the glass plate 163 and held in position by the spring clips 165. The mask can be adjusted, altered, or replaced by other masks, very easily and simply, until exactly the right conditions are obtained in the image on the viewing screen.

When the proper position of the viewing screen has been found to make the image of the size desired for the photographic print, then the camera body 37, 39 is moved along its trackway on the frame 31 until the pointer 383 points to the same number or indication on the scale 385, as that which is opposite the pointer 387 associated with the viewing screen. When this correspondence of indicia on the two scales is attained, the photo sensitive material in the focal plane 53 of the camera will be at the same distance from the lens and prism unit as the distance between this unit and the viewing screen, so that it necessarily follows that if the lens and prism unit is turned to transfer the image from the viewing screen to the photo sensitive material, the image will be of the same size as was the case on the viewing screen.

The lens and prism unit is now turned through 90° by bringing the handle 315 down to the position shown in Figs. 2 and 10. This transfers the projected image from the optical axis B to the optical axis C, and when the shutter 89 is opened by a pull on the cord 91, the image will fall on the photo sensitive material at 53 and a photographic exposure will be made. Because of the arrangement of parts above described, the image on the exposure will be of exactly the same size as that previously viewed on the viewing screen, so that it is very convenient for the operator to make any size of print he wishes (within the reasonable limits of the machine) and to cut out or remove any desired part of any given transparency by the use of suitable masks, with complete assurance that when he is satisfied with the result as viewed on the viewing screen, exactly the same result will be obtained in the photographic print.

After the exposure has been made, the winding rolls 55 are operated by the handle 57 to wind down the exposed portion of the sheet material into the developing bath within the tank 61, which exposed portion is then cut off by operation of the severing knife connected to the handle 59. After development has been completed, the print is transferred to the fixing bath within the tank 65 and suitably fixed, after which it is washed and dried, making the completed photographic print.

If more than one print of the same exposure is desired, as many successive prints may be made as necessary, by leaving the lens and prism assembly and other parts set in the same position, without the necessity of throwing the image back onto the viewing screen.

When the transparency to be viewed and reproduced in a photographic print is part of a strip or roll of film, such strip is placed on one of the reels 179 or 195, or if already mounted on a reel, this reel is placed on one of the shafts 177 or 193, and the strip is threaded over the guide rollers 201 and 205, and between the plates 149 and 163, the handle 291 being operated to separate these plates during the threading operation. Then the handle 291 may be restored to its normal position, and the crank 211 may be operated in one direction or the other to wind successive portions of the strip past the glass presser plates 149 and 163, until the desired one of the images or "frames" is found. Turning the crank 211 in either direction automatically separates the presser plate 163 from the plate 149 by causing the cam surface 271 or 273 on the collar 245 to shift the lever 275 to press against the thrust pin 281 to move the plate 163, so that there is no pressure on the strip of film while it is being fed past the plates 149 and 163, thus avoiding scratching or other damage to the film. As soon as turning of the crank 211 ceases, the springs 269 throw the collar 245 back to its central position, unclutching the crank 211 from the reels 179 and 195 and releasing the thrust on the pin 281 so that the spring 167 may press the plate 163 firmly toward the plate 149 to hold the film truly flat between them.

Although the preferred use of the apparatus above described is to view images on a viewing screen in connection with the making of photographic prints of such images, yet it is not essential that both the viewing and the photographic print making be accomplished. It is within the scope of the present invention to use this apparatus, or the necessary parts thereof, simply for viewing or reading images, without making any photographic prints, and it is also within the scope of the invention to use this apparatus, or parts thereof, simply for making photographic prints without the feature of previously viewing the image as projected upon the viewing screen at 365 or at 77. In the latter event, the image may be focused by using a ground glass focusing plate in the focal plane of the camera, opening up the magazine section 39 away from the body section 37 and placing a focusing frame against the back of the body section 37 which frame carries a ground glass plate in a position corresponding to that of the focal plane of the camera. Or again, the apparatus may be focused by a trial focusing of any transparency upon the viewing screen 365 and a subsequent setting of the camera body at a corresponding position on the scale 385, after which any number of photographic prints of any desired transparency can be made without previously viewing them on the viewing screen, which prints will all be properly focused so long as the focusing screw 117 and the position of the camera body relatively to the scale 385 remain unchanged.

It is noted that no dark room is required, it being possible to set up this apparatus in a room constantly illuminated with strong light, without in any way detracting from the usefulness of the various features of this invention.

Certain subject matter disclosed but not claimed in this application is claimed in my divisional applications, Serial No. 270,589, filed April 28, 1939, for Optical projection apparatus, and Serial No. 293,391, filed September 5, 1939, for Photographic method.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:

1. In photographic apparatus, the combination of a dark chamber, means for holding sensitized material in a focal plane therein, a viewing screen exteriorly of said dark chamber, light projecting means, means for holding a transparency in the path of light rays coming from said projecting means, and a shiftable catadioptric unit in the path of said light rays beyond said transparency, said catadioptric unit being movable to one position effective to project said light rays exteriorly of said dark chamber upon said viewing screen and to another position effective to project said light rays into said dark chamber and onto said sensitized material.

2. In photographic apparatus, the combination of a dark chamber, means for holding sensitized material in a focal plane therein, a viewing screen exteriorly of said dark chamber, light projecting means, means for holding a transparency in the path of light rays coming from said projecting means, shiftable light ray bending means in the path of said light rays beyond said transparency, said bending means being movable to one position effective to project said light rays upon said viewing screen and to another position effective to project said light rays into said dark chamber and onto said sensitized material, means for adjusting the distances of said focal plane, said viewing screen, and said light ray bending means from each other, graduated scale means carrying indicia for indicating the distance of said viewing screen from said light ray bending means, and graduated scale means carrying indicia for indicating the distance of said focal plane from said light ray bending means, the indicia on one of said scale means corresponding to the indicia on the other of said scale means so that when said light rays are properly focused on said viewing screen at any given distance thereof from said bending means, the distance from said bending means to said focal plane may be readily set to the same magnitude, whereupon said light rays will be properly focused on said sensitized material when said bending means is shifted to project said light rays into said dark chamber.

3. A construction as described in claim 1, further including variable diaphragm stop means associated with said catadioptric unit to control the effective aperture thereof, and means for automatically shifting said diaphragm stop means upon shifting said catadioptric unit.

4. In photographic apparatus, the combination of a camera including a front and a focal plane support spaced from said front, a viewing screen exteriorly of and spaced from said camera, a holder for holding an object to be photographed, and a catadioptric unit mounted on said camera front, said unit being mounted for shifting movement from one to another of two positions, in one of which it receives light rays from said object and projects them upon said screen, and in the other of which it receives light rays from said object and projects them into said camera toward said focal plane support.

5. A catadioptric unit for light projecting appliances, including a casing, a member mounted within said casing for oscillation about an axis, said casing having a window through which light may enter said casing in a direction substantially along said axis and having two windows through which light my leave said casing in a lateral direction with respect to said axis, a light bending element mounted on said member in position to receive light rays entering said casing substantially axially through said first mentioned window and to bend said light rays so that they tend to leave said casing in a lateral direction, lens means also mounted on said member to refract light rays passing through said unit, and a part accessible from the exterior of said casing for turning said member within said casing to direct the bent light rays selectively toward one or the other of said two lateral windows.

6. A construction as described in claim 5, in which said member within said casing is in the form of a hollow sleeve open at one end for entrance of light rays and open at one side for exit of light rays, and in which said light bending element is in the form of an optical prism mounted at least partly within said sleeve, and in which said lens means is mounted in said open end of said sleeve.

7. An optical unit for light projecting appliances, including a casing, a member mounted within said casing for oscillation about an axis, said casing having a window through which light may enter said casing in a direction substantially along said axis and having two windows through which light may leave said casing in a lateral direction with respect to said axis, a lens mounted on said member adjacent said entrance window, a light bending element mounted on said member in position to receive light rays entering said casing substantially axially through said entrance mentioned window and to bend said light rays so that they tend to leave said casing in a lateral direction, an adjustable diaphragm controlling entrance of light toward said bending element, means mounted for movement with respect to said member for changing the degree of opening of said diaphragm, a part accessible from the exterior of said casing for turning said member within said casing to direct the bent light rays selectively toward one or the other of said two lateral windows, and cooperating parts on said movable means and said casing to turn said movable means with respect to said member when said member is turned with respect to said casing, to open said diaphragm to one extent when said bent light rays are directed toward one of said lateral windows and to open said diaphragm to a different extent when said bent light rays are directed toward the other of said lateral windows.

8. Photographic apparatus including a frame, a camera having a front portion mounted on said frame and a body portion mounted on said frame for focusing movement toward and away from said front portion, means for holding photo sensitive material in said body portion in position to receive light rays entering said camera from adjacent said front portion and passing along the optical axis of said camera from said front portion toward said body portion, a copyholder mounted on said frame externally of and spaced from said camera for movement toward and away from said optical axis of said camera, mechanism mounted on said camera front portion for holding a transparency in a position laterally offset from said camera optical axis and for illuminating said transparency, and a light ray bending element mounted on said camera front portion approximately in alinement with said camera optical axis and approximately opposite said transparency in position to receive light rays therefrom, said bending element being mounted for turning movement from one position to another, in one of which positions the light rays received by said element from said transparency are projected from said element toward said copyholder without entering said camera, and in the other of which positions said light rays are projected from said element along said camera optical axis toward said photo sensitive material.

9. A construction as described in claim 8, further including a screen, a frame for holding said screen, said screen being of different area than said copyholder, and pins mounted on said frame for locating said frame on said copyholder in proper position so that said screen will receive said light rays projected toward said copyholder.

10. A construction as described in claim 8, further including walls mounted on said copyholder surrounding the beam of light projected from said bending element towards said copyholder, said walls extending a substantial distance toward but not fully to said bending element, to tend to shield the image of said beam of light from lateral stray light and to provide ample space between said walls and said bending element through which said image may be viewed.

11. Photographic apparatus including a lens and prism assembly effective to receive light rays coming toward said assembly along a receiving axis and to bend said rays through a substantial angle and project them from said assembly along a projection axis at a substantial angle to said receiving axis, holding means for holding a subject on said receiving axis, illuminating means for illuminating said subject so that light therefrom will pass along said receiving axis toward said lens and prism assembly, a viewing screen arranged laterally of said receiving axis in one direction therefrom, photo sensitive material arranged laterally of said receiving axis in another direction therefrom, means mounting said lens and prism assembly for turning movement approximately about said receiving axis as a center, said assembly being turnable to one position in which said projection axis is directed toward said viewing screen and to another position in which said projection axis is directed toward said sensitive material, a shutter for controlling passage of light to said sensitive material, means mounting said viewing screen for movement toward and away from said lens and prism assembly, means mounting said photo sensitive material and said lens and prism assembly for relative movement toward and away from each other, and means mounting said subject holding means for movement toward and away from said lens and prism assembly, for purposes of focusing.

12. Photographic apparatus including a lens and prism assembly effective to receive light rays coming toward said assembly along a receiving axis and to bend said rays through a substantial angle and project them from said assembly along a projection axis at a substantial angle to said receiving axis, holding means for holding a subject on said receiving axis, illuminating means for illuminating said subject so that light therefrom will pass along said receiving axis toward said lens and prism assembly, a viewing screen arranged laterally of said receiving axis in one direction therefrom, photo sensitive material arranged laterally of said receiving axis in another direction therefrom, means mounting said lens and prism assembly for turning movement approximately about said receiving axis as a center, said assembly being turnable to one position in which said projection axis is directed toward said viewing screen and to another position in which said projection axis is directed toward said sensitive material, a shutter for controlling passage of light to said sensitive material, means mounting said viewing screen for movement toward and away from said lens and prism assembly, means mounting said photo sensitive material and said lens and prism assembly for relative movement toward and away from each other, means mounting said subject holding means for movement toward and away from said lens and prism assembly, for purposes of focusing, a scale for determining the position of said viewing screen with respect to said lens and prism assembly, and another scale for determining the position of said photo sensitive material with respect to said lens and prism assembly, both of said scales being graduated in corresponding units so that the distance between said sensitive material and said assembly may quickly be set to the same magnitude as the distance between said screen and said assembly.

13. In photographic apparatus, the combination of photo sensitive material, a viewing screen, a holder for holding a subject to be enlarged, means for illuminating said subject, and a catadioptrical unit for receiving light rays from said subject and projecting them along a definite optical path, said catadioptric unit being mounted for movement relative to said material and screen from one position effective to project said rays onto said screen, to another position effective to project said rays onto said material, said screen being mounted for movement toward and away from said unit to vary the size of the image projected on said screen, said holder being mounted for movement toward and away from said unit to focus the image of the subject held by said holder for any given position of said screen, and said sensitive material being mounted for movement toward and away from said unit so that it may be placed at a distance from said unit corresponding to the distance from said unit to said screen.

14. In photographic apparatus, the combination of a dark chamber, photo sensitive material within said dark chamber, a viewing screen mounted exteriorly of said dark chamber, a holder for holding a subject, a catadioptric unit for receiving light rays from said subject and projecting them along a definite optical path, said unit being mounted for turning movement relatively to said screen and dark chamber from one position effective to project said rays in one direction onto said screen to a second position effective to project said rays in a second direction toward said sensitive material, and a shutter associated with said dark chamber and in the path of rays between said unit and said sensitive material for controlling passage of light rays from said unit to said sensitive material.

15. A combined photo copying machine and microfilm reading and copying device, comprising a frame, a camera body including a front portion and a back portion mounted on said frame for movement of one relatively to the other for focusing, said front portion having an opening through which light may enter said camera body to pass along the optical axis thereof toward said back portion, means on said front portion for detachably holding a light bending device adjacent said opening, a copyholder adjustably mounted on said frame beneath said light bending device for upward and downward movement relatively thereto, said copyholder extending in a generally horizontal direction to receive and support a document to be copied when said machine is used as a photo copying machine, light projecting means mounted on said front portion in laterally offset relation to said light bending device, and means for holding a strip of film between said light projecting means and said light bending device so that an image of said film may be received by said light bending device and may be projected thereby downwardly toward said copyholder for viewing purposes or rearwardly into said camera body, when said machine is used as a microfilm reading and copying device.

16. A combined photo copying machine and microfilm reading and copying device, comprising a frame, a camera body including a front portion and a back portion mounted on said frame for movement of one relatively to the other for focusing, said front portion having an opening through which light may enter said camera body to pass along the optical axis thereof toward said back portion, a copyholder adjustably mounted on said frame below said front portion for upward and downward movement relative thereto, said copyholder extending in a generally horizontal direction to receive and support a document to be copied, a source of light mounted on said front portion in a position laterally offset from said optical axis of said camera, a holding device also mounted on said front portion for holding a transparency in a position interposed between said source of light and said optical axis, and means on said front portion for detachably holding either a fixed light bending device adapted to receive light rays coming upwardly from a document on said copyholder and to bend them to pass rearwardly into said camera to make a photographic print thereof when said machine is being used as a photocopying machine, or a shiftable light bending device adapted to receive light rays coming laterally from said transparency and bend them to pass downwardly toward said copyholder for viewing purposes or to pass rearwardly into said camera to make a photographic print thereof when said machine is being used as a mocrofilm reading and copying device.

17. The combination of a camera dark chamber having an axis, means for holding sensitized sheet material in said dark chamber substantially in a plane perpendicular to said axis, a source of light, lens means for projecting light from said source along a second axis approximately perpendicular to and intersecting said dark chamber axis at a point exteriorly of said dark chamber, means for holding a transparency across said second axis between said lens means and said dark chamber axis, a third axis approximately mutually perpendicular to and intersecting said dark chamber axis and said second axis, a copyholder lying across said third axis approximately perpendicular thereto, and a shiftable light reflecting member mounted substantially at the intersection of said three axes for rotation about an axis substantially coincident with said second axis, said reflecting member being rotatable from one position in which it receives light approaching along said second axis and bends it to project it along said third axis toward said copyholder, to another position in which it receives light approaching along said second axis and bends it to project along said dark chamber axis toward said sensitized sheet material.

PAUL LANDROCK.